United States Patent [19]

Wagle

[11] 4,311,059
[45] Jan. 19, 1982

[54] MEANS PROVIDING INTERMITTENT MOTION TO A CAM MEANS OF A TIMING MECHANISM

[75] Inventor: William E. Wagle, Bloomington, Ind.

[73] Assignee: Emhart Industries, Inc., Indianapolis, Ind.

[21] Appl. No.: 71,727

[22] Filed: Aug. 31, 1979

[51] Int. Cl.³ .................... F16H 29/00; H01H 7/08
[52] U.S. Cl. ................................. 74/116; 74/435; 74/436
[58] Field of Search ............ 200/27 B, 38 B, 38 BA, 200/38 C, 38 CA; 74/116, 435, 436, 437, 568 T, 122–125

[56] References Cited

U.S. PATENT DOCUMENTS

| 3,003,358 | 10/1961 | Leonard | 74/116 |
| 3,260,128 | 7/1966 | Gassino et al. | 74/435 |
| 3,738,185 | 6/1973 | Wooley | 74/116 |
| 3,811,019 | 5/1974 | Solari | 200/27 B |
| 3,813,952 | 6/1974 | Fehrenbacher | 74/435 |
| 3,840,107 | 10/1974 | Mack et al. | 74/436 |
| 3,857,293 | 12/1974 | Godwin et al. | 74/125 |
| 4,152,954 | 5/1979 | Stout et al. | 74/568 T |

FOREIGN PATENT DOCUMENTS

| 1066766 | 10/1959 | Fed. Rep. of Germany | 74/437 |
| 2249176 | 4/1973 | Fed. Rep. of Germany | 74/435 |
| 790174 | 9/1935 | France | 74/437 |
| 567693 | 2/1945 | United Kingdom | 74/436 |
| 797908 | 7/1958 | United Kingdom | 74/437 |
| 1142122 | 2/1969 | United Kingdom | 200/38 BA |

Primary Examiner—Lawrence J. Staab
Attorney, Agent, or Firm—Robert F. Meyer; David W. Gomes

[57] ABSTRACT

A geneva drive means is used in combination with an eccentric drive means to provide intermittent motion to a cam means.

8 Claims, 6 Drawing Figures

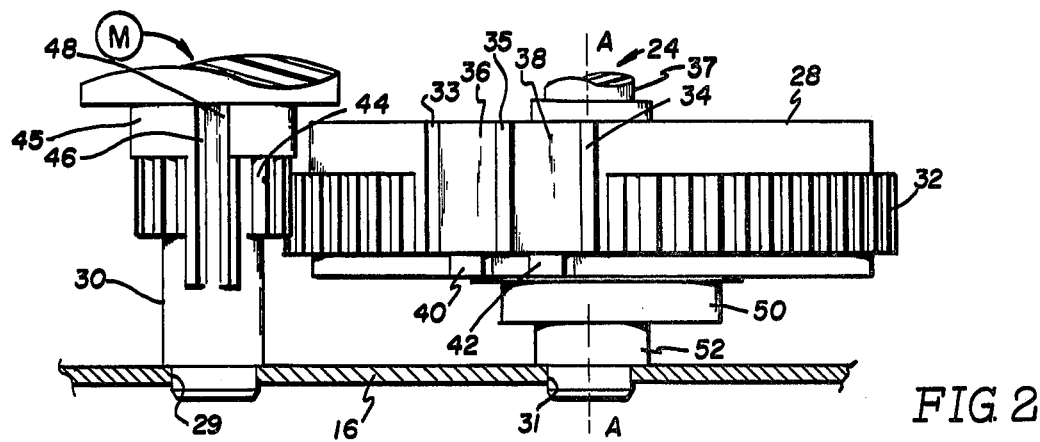
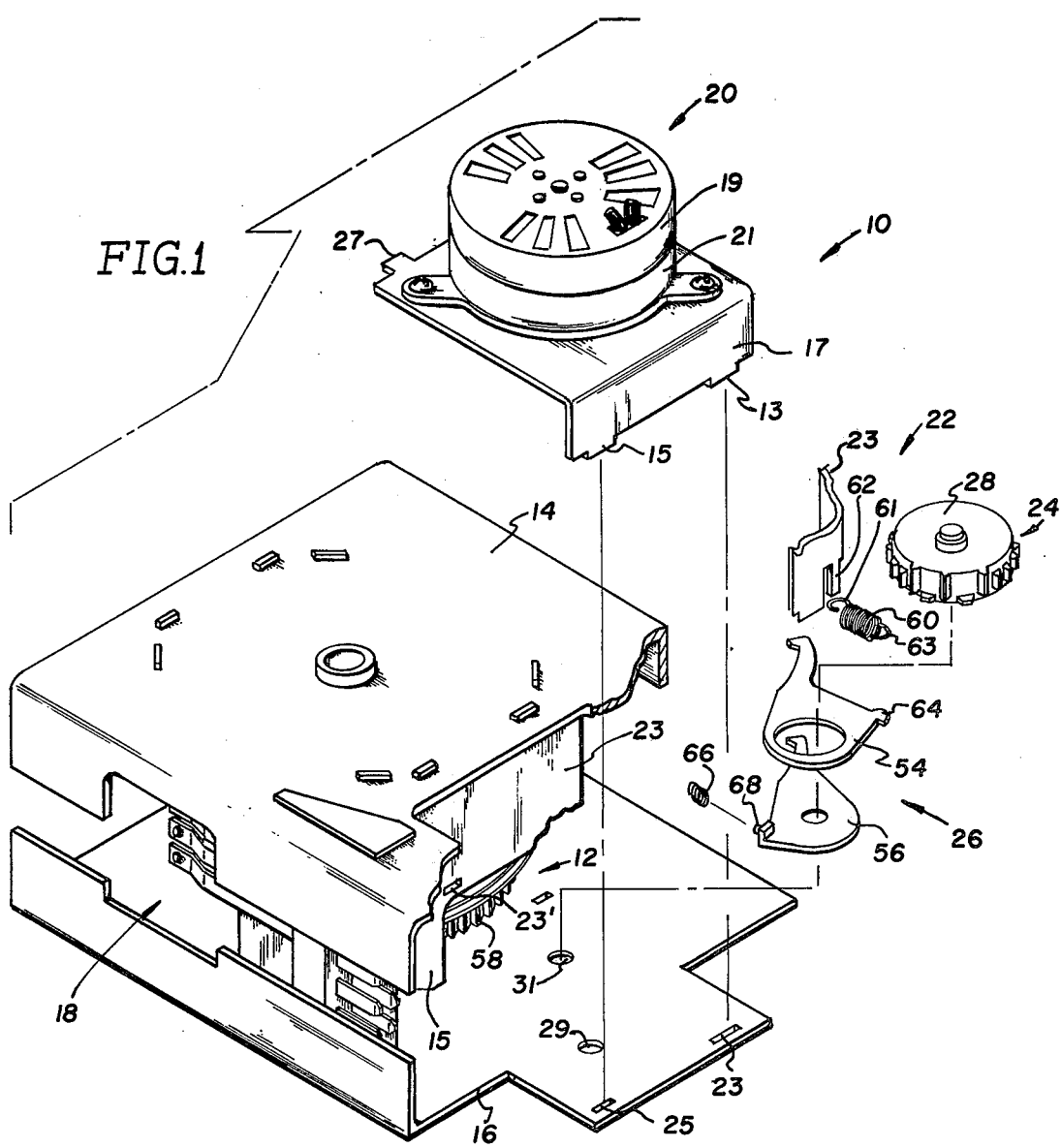

MEANS PROVIDING INTERMITTENT MOTION TO A CAM MEANS OF A TIMING MECHANISM

BACKGROUND OF THE INVENTION

The present invention relates to a timing mechanism and more particularly to an intermittent drive means for such mechanism.

Generally speaking, there is provided an intermittent drive means for coupling a cam means to a motor drive means of a timing mechanism, the intermittent drive means comprising a motor output member, and a combination of a geneva drive means coupled to the motor output member, and eccentric drive means coupled to the geneva drive means and engaging the cam means.

Timing mechanisms have long been used in the appliance industry to provide program sequences to appliances such as dishwashers, washers, and dryers. Usually in the operation of such timing mechanisms, the cam means, which opens and closes electrical switches, are rotated in a step by step manner by some sort of intermittent drive mechanism.

One type of intermittent drive mechanism uses an eccentric wherein at least one drive pawl operates off an eccentric to index variable ratchet teeth coupled to the cam means. An eccentric in combination with variable ratchet teeth permits large advances of the cam means when critical timing functions are being performed and small advances when no critical functions are performed.

Another type of intermittent motion used in timing mechanisms includes the use of geneva drive means. The use of this type of motion permits the use of dwell periods when no type of motion is desired.

The present invention contemplates the use of a geneva drive mechanism and an eccentric drive mechanism in combination to provide an intermittent motion consisting of dwell and drive periods. Such a combination provides (as will be hereinafter discussed) greater timing accuracy and also increases the life of the electrical contacts used in the switches of the timing mechanism.

OBJECTS OR FEATURES OF THE INVENTION

It is, therefore, a feature of the present invention to provide a timing mechanism having an intermittent driven mechanism which provides for greater timing accuracy and longer life of the electrical contacts of the timing mechanism's switches. Another feature of the invention is to provide an intermittent drive mechanism combining an eccentric drive with a geneva drive. Another feature of the invention is to provide such an intermittent drive mechanism wherein the eccentric includes a pair of drive pawls operating off of separate eccentrics. Another feature of the invention is to provide such a mechanism wherein the geneva drive means includes a rotating driven member having sections of first peripheral gear teeth of a predetermined length, dwell spaces determined by second peripheral teeth of longer length, and third peripheral gear teeth shorter than the first and in line with the dwell spaces; and a rotating driver member having first peripheral gear teeth engaging the first peripheral gear teeth of the driven member, and second peripheral gear teeth engaging the second and third peripheral gear teeth of the driven member. Still another feature of the present invention is to provide such a mechanism wherein the eccentric drive means and a driven member of the geneva drive means are carried on the same shaft. These and other features of the invention will become apparent from the following description taken in conjunction with the accompanying drawings.

DESCRIPTION OF THE DRAWINGS

FIG. 1 is an exploded view of a timing mechanism utilizing the features of the invention.

FIG. 2 is a partial section showing the intermittent drive means of the present invention.

Figure 3:
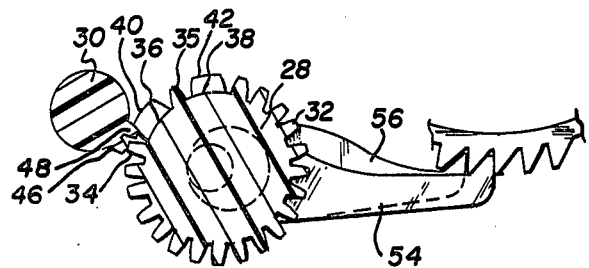
FIGS. 3-6 are sections showing different operating modes of the intermittent drive means.

Referring now to the drawings, there is shown a timing mechanism 10 employing the features of the invention. Timing mechanism 10 in general includes a cam means 12 rotatably journalled between end plates 14 and 16, electrical switch means 18 which engage and are responsive to the cam means 12, a motor drive means 20 carried by end plate 16 through motor mounting plate 17, and coupling means 22 coupling the motor drive means to the cam means 12 to impart intermittent rotation thereto. In general, coupling means 20 includes a geneva drive means 24 in combination with an eccentric drive means 26.

Motor drive means 20 includes a motor 19 which may be of the synchronous type and a gear train 21 to provide a desired output speed. It is mounted on end plate 16 through tangs 13 and 15 engaging slots 23 and 25. Similar tangs 27 engage slots 23' in side plate 23.

Geneva drive means 24 includes a driven rotating member 28 having an axis of rotation AA, defined by shaft 37 and a driver member 30 which is the present embodiment includes a motor output pinion of gear train 21. As shown, drive member 28 has three sets of teeth. The first set of teeth includes sections of peripheral teeth 32. The second set of teeth includes teeth 33, 34 and 35 of longer length and which provide dwell spaces 36 and 38. A third set of teeth includes shorter teeth 40 and 42 which are in line with dwell spaces 36 and 38. Driver member 30 has two sets of teeth. One set 44 meshes with and is in engagement with the sections of peripheral teeth 32 while a second set 46 and 48 engage teeth 33, 34 and 35 and short teeth 40 and 42 of the driven member. Driver member 30 also includes a shoulder 45 which holds driven member 28 in place during the dwell periods by the shoulder engaging either of teeth 33, 35 or 34, 35. Both the driver and driven member are rotatably journalled in aperatures 29 and 31 provided in end plate 16.

Eccentric drive means 26 includes a pair of eccentrics 50 and 52 which are offset from the axis of rotation A—A of rotating member 28. but integral with shaft 37. Main drive pawl 54 and secondary drive pawl 56 are carried on eccentrics 50 and 52 respectively to be driven thereby. The drive pawls engage variable ratchet teeth 58 which are integrally constructed with cam means 12. Pawl 54 is biased into engagement with teeth 58 through spring 60 which is held at one end by eyelet 61 engaging tab 62 formed in plate 23 and at the other end by eyelet 63 engaging tab 64 of the drive pawl. Drive pawl 56 is held into engagement with the teeth 58 through compression spring 66 which is biased against plate 15 and against tab 68 of pawl 56.

As previously noted, the use of the variable ratchet teeth 58 permits large advances of cam means 12 when critical timing functions are performed and small advances when less critical functions are performed. The multiple drive pawls permit flexibility in the manner in which the ratchet teeth are advanced and the geneva drive permits variable dwell times. Using the two systems in combination combines the advantages of both without the disadvantages of either. For example, the combination utilizes the geneva drive means to provide dwell periods during the rotation of the eccentric drive means. The dwell periods are programmed to occur during the retraction of the main drive pawl 54 operated by the eccentric. This permits the use of a faster R.P.M. motor for a given time interval than would be possible with a conventional eccentric drive system. The faster R.P.M. motor drives the pawl forward at a higher rate which reduces the time required for a mechanical advance. For example, on a sixty second time base, forty-five seconds is used to retract the main drive pawl and fifteen seconds is used for driving the pawl forward. A conventional eccentric drive system without the dwell periods, would require thirty seconds to retract and thirty seconds to drive. The faster advance rate not only provides for greater timing accuracy, but also increases the life of the electrical contacts of switch means 18. Such operation can be described with reference to FIGS. 2-5.

Referring first to FIG. 2, the operation of geneva drive means 24 can be described. In the illustrative embodiment shown, driver member 30 is rotating clockwise to drive the driven member 28 in a counterclockwise direction. The driven members will rotate so long as the teeth 44, 46 and 48 are in mesh with teeth 32. During the period of time when teeth 44 only are aligned with dwell space 36 or 38, driven member 28 will not rotate and is held in place by shoulder 45. Further rotation of drive member 30 engages teeth 46 and 48 with 33, 34, 35, 40 and 42 to again rotate the driven member.

Figure 4:
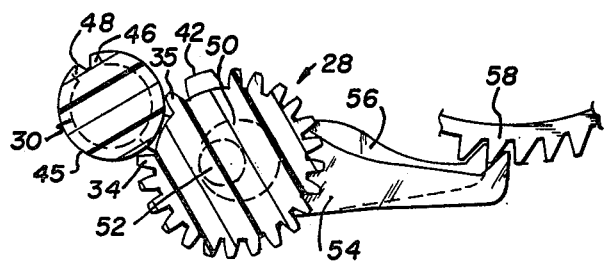
Figure 5:
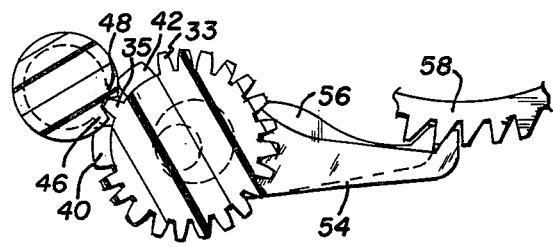
Figure 6:
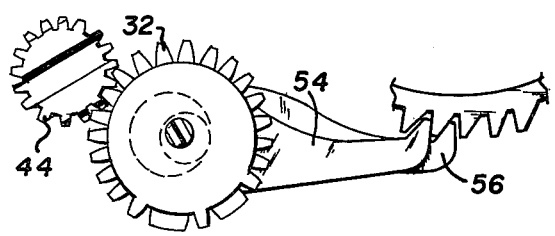

Referring now to FIGS. 3-6, the operation of eccentric drive means 26 may be described. As driven member 28 rotates counterclockwise, eccentrics 50 and 52 (FIG. 2) also rotate to rotate main drive pawls 54 and secondary drive pawl 56 respectively. In FIG. 3, teeth 46 and 48 are about to become disengaged from tooth 35. Main drive pawl 54 is at its maximum drive position while secondary drive pawl 56 is starting to drive. In FIG. 4, driver member 30 is in a dwell space of driven member 28 with shoulder 45 of the driver member holding the driven member in place. In this mode, drive pawls 54 and 56 are stationary. In FIG. 5, teeth 46 and 48 of the driver member are engaging tooth 35 and dwell space 36 and about to engage tooth 42 to start driven driven member 28. Main drive pawl 54 is retracting while secondary drive pawl 56 is driving. In FIG. 6, teeth 44 of driver member 30 are engaged with teeth 32 of driven member 28 to drive it while main drive pawl 54 is driving and secondary drive pawl 56 is retracting.

It should be noted that since the pawls are alternately driving and retracting, a reverse rotation of the cam mean is precluded.

What is claimed is:
1. A timing mechanism comprising:
   (1) motor drive means
   (2) cam means and electrical switch means opening and closing in response to said cam means, and
   (3) intermittent drive means coupling said cam means to said motor drive to provide intermittent rotation of said cam means comprising:
   a geneva gear means coupled to said motor drive means and including cooperating drive teeth and dwell spaces, and eccentric drive means coupled to said geneva gear means and including a drive pawl engaging said means to intermittently drive same,
   said geneva gear means programmed such that said dwell spaces are operative to prevent rotation of said eccentric during retraction of said drive pawl.

2. In a timing mechanism according to claim 1 wherein an eccentric of said eccentric drive means and a driven member of said geneva drive means are carried on the same shaft.

3. In a timing mechanism according to claim 2 wherein said eccentric is carried on said driven member.

4. In a timing mechanism according to claim 1 wherein said geneva drive means includes a rotating driven member having sections of first peripheral gear teeth of a predetermined length, dwell spaces determined by second peripheral teeth of longer length, and third peripheral gear teeth shorter than said first peripheral gear teeth in line with said dwell spaces, and a rotating driver member having first peripheral gear teeth engaging said first peripheral teeth of said driven member, and second peripheral gear teeth engaging said second and third peripheral gear teeth of said driven member.

5. In a timing mechanism according to claim 1 wherein said eccentric drive means includes a rotating member coupled to said geneva drive means and having a central axis of rotation, and a pair of eccentrics carried on said rotating member, and a pair of drive pawls, one each carried by one of said eccentrics to be driven thereby, said pair of pawls engaging said cam means.

6. In a timing mechanism wherein a cam means is rotated by a motor drive means and electrical switch means open and close in response to said cam means, an intermittent drive means coupling said motor drive means to said cam means comprising:
   (a) a rotatable member driven by said motor drive means and having a pair of drive portions eccentric to the rotational axis of said rotatable member, and
   (b) a pair of drive pawls, one each carried by one of said eccentrics, both of said drive pawls engaging said cam means to alternately drive said cam means in a step-by-step manner, both of said pawls also alternately precluding reverse directional rotation of said cam means.

7. In a timing mechanism wherein a cam means is rotated by a motor drive means and electrical switch means open and close in response to said cam means, an intermittent drive means coupling said cam means to said motor drive means to provide intermittent rotation of said cam means comprising:
   (a) a motor output member, and
   (b) a combination of a geneva drive means coupled to said motor output member, and eccentric drive means coupled to said geneva drive means and engaging said cam means,
   said geneva drive means including a rotating driven member coupled to said cam means and having sections of first peripheral gear teeth of a predetermined length, dwell spaces determined by second peripheral teeth of longer length, and third peripheral gear teeth shorter than said first peripheral gear teeth in line with said dwell spaces, and a rotating driver member coupled to said motor output member and having first peripheral gear teeth engaging said first peripheral teeth of said driven member, and second peripheral gear teeth engaging said second and third peripheral gear teeth of said driven member.

8. A geneva drive means comprising:
(a) a rotating driven member having sections of first peripheral gear teeth of a predetermined length, dwell spaces determined by second peripheral gear teeth of a greater length, and third peripheral gear teeth of shorter length than said predetermined length and in line with said dwell spaces, and
(b) a rotating driver member having first peripheral gear teeth engaging said first peripheral gear teeth of said driven member, and second peripheral gear teeth engaging said second and third peripheral gear teeth of said driven member.

* * * * *

UNITED STATES PATENT AND TRADEMARK OFFICE
CERTIFICATE OF CORRECTION

PATENT NO. : 4,311,059
DATED : January 19, 1982
INVENTOR(S) : William E. Wagle

It is certified that error appears in the above—identified patent and that said Letters Patent is hereby corrected as shown below:

In claim 1, line 12, insert---cam---after "said".

Signed and Sealed this

Twenty-third Day of March 1982

[SEAL]

Attest:

GERALD J. MOSSINGHOFF

Attesting Officer    Commissioner of Patents and Trademarks